US010104559B2

United States Patent
Immendorf et al.

(10) Patent No.: US 10,104,559 B2
(45) Date of Patent: Oct. 16, 2018

(54) METHOD FOR DOWNLINK JAMMER DETECTION AND AVOIDANCE IN LONG-TERM EVOLUTION (LTE) NETWORKS

(71) Applicant: Eden Rock Communications, LLC, Bothell, WA (US)

(72) Inventors: Chaz Immendorf, Bothell, WA (US); Jungnam Yun, Bothell, WA (US); Eamonn Gormley, Bothell, WA (US)

(73) Assignee: SPECTRUM EFFECT, INC., Seattle, WA (US)

( * ) Notice: Subject to any disclaimer, the term of this patent is extended or adjusted under 35 U.S.C. 154(b) by 36 days.

(21) Appl. No.: 14/137,920

(22) Filed: Dec. 20, 2013

(65) Prior Publication Data

US 2014/0204766 A1 Jul. 24, 2014

Related U.S. Application Data

(60) Provisional application No. 61/754,713, filed on Jan. 21, 2013.

(51) Int. Cl.
*H04W 24/04* (2009.01)

(52) U.S. Cl.
CPC .................................. *H04W 24/04* (2013.01)

(58) Field of Classification Search
CPC ...................................................... H04W 24/04
See application file for complete search history.

(56) References Cited

U.S. PATENT DOCUMENTS

| | | | |
|---|---|---|---|
| 7,202,784 B1* | 4/2007 | Herwig | 340/568.1 |
| 2002/0197978 A1* | 12/2002 | Zavidniak | 455/410 |
| 2007/0167131 A1* | 7/2007 | Nishida | H04B 1/1027 455/1 |
| 2009/0067340 A1* | 3/2009 | Jakobsen et al. | 370/252 |
| 2009/0209196 A1* | 8/2009 | Haverty | 455/1 |
| 2010/0289688 A1* | 11/2010 | Sherman | H04B 1/1036 342/16 |
| 2012/0129517 A1* | 5/2012 | Fox | H04L 41/5025 455/425 |

OTHER PUBLICATIONS

Dr. Jeffrey H. Reed, Synchronization Signal Jamming, Nov. 8, 2012, Virginia Tech, 1-9.*

* cited by examiner

*Primary Examiner* — Noel R Beharry
*Assistant Examiner* — Wilfred Thomas

(57) ABSTRACT

A method for handling a jamming signal in a wireless network includes obtaining network measurement data on a wireless network performance, the network measurement data collected by a wireless network element. A first performance information on the wireless network performance is derived based on the network measurement data obtained. The first performance information is examined with respect to a predefined value. An alert is issued to indicate a presence of a potential jamming signal based on a result of the examination of the first performance information.

16 Claims, 14 Drawing Sheets

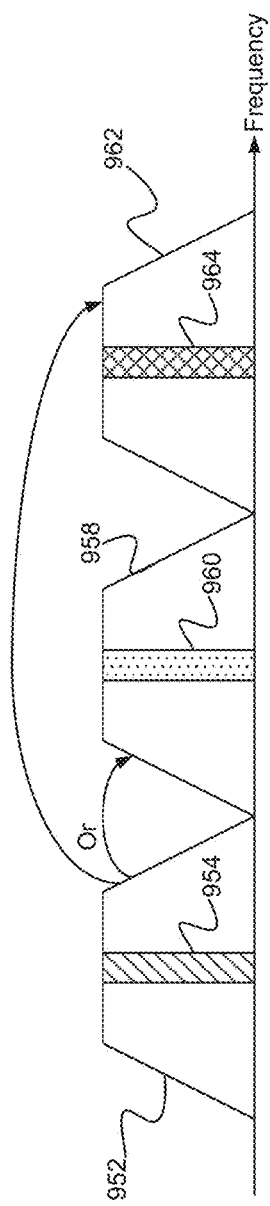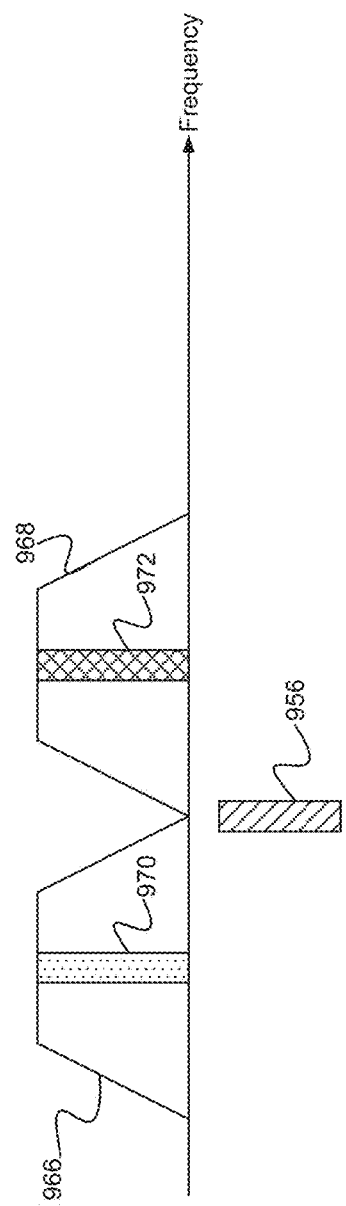

METHOD FOR DOWNLINK JAMMER DETECTION AND AVOIDANCE IN LONG-TERM EVOLUTION (LTE) NETWORKS

CROSS-REFERENCES TO RELATED APPLICATIONS

The present invention claims priority to and is a non-provisional of U.S. Application No. 61/754,713, filed Jan. 21, 2013, which incorporated by reference for all purposes.

BACKGROUND

Wireless data communication operators often expend significant resources in order to license and broadcast over a dedicated communications frequency spectrum. Theoretically, this license awards the operator exclusive access to the licensed spectrum across a specific geographic region or area. Based on their exclusive rights, operators may advantageously plan where and how they wish to allocate network resources, including, but not limited to: network controllers (e.g., network switching centers and/or network managers), databases, base stations, gateways, signal repeaters, etc. Operators within a network may also use their proprietary rights to determine which frequencies to employ at each base station within a particular network topology. In this way, licensed operators can effectively optimize the design of their data communications networks to maximize system integrity and throughput.

In the case of high-bandwidth Long-Term Evolution (LTE) wireless communications networks, the networks may be vulnerable to deliberate jamming signals designed to attack specific frequency and time resources for a portion of the frequency bandwidth, such as synchronization channels and broadcast channels in a downlink. An inexpensive jamming signal device can transmit in the timeslots and frequencies used for these channels, rendering the channels unusable. Unless these jamming signals are detected and avoided, users in a wide area around the jamming signal may experience a Denial of Service.

BRIEF SUMMARY

In an embodiment, a method for handling a jamming signal in a wireless network includes obtaining network measurement data on a wireless network performance, the network measurement data collected by a wireless network element. The first performance information on the wireless network performance is derived based on the network measurement data obtained. The first performance information is examined with respect to a predefined value. An alert is issued to indicate a presence of a potential jamming signal based on a result of the examination of the first performance information.

According to an embodiment, a method for handling a jamming signal in a wireless network includes obtaining network measurement data a wireless network performance, the network measurement data being data collected by a wireless network element, deriving a first performance information on the wireless network performance based on the network measurement data obtained, examining the first performance information with respect to a predefined value, and issuing an alert to indicate a presence of a potential jamming signal based on a result of the examination of the first performance information.

In an embodiment, the first performance information relates to a Key Performance Indicator (KPI) and the wireless network is a Long-Term Evolution network.

In an embodiment, the KPI is one selected from the following: a number of active user equipment (UE) connected to a base station, a cell throughput for a region, a call drop rate for a region, and a handover failure rate for a region.

In an embodiment, the predefined value is a threshold value based on historical KPI data.

In an embodiment, the examining step involves determining whether or not the first performance information meets or exceeds the threshold value.

In an embodiment, the potential jamming signal is a potential downlink transmission jamming signal. The method further includes obtaining additional network measurement data if the alert issued, and determining whether or not the potential downlink transmission jamming signal is a jamming signal based on the additional network measurement data.

In an embodiment, the method further includes updating the predefined value if the potential downlink transmission jamming signal is determined not to be a jamming signal.

In an embodiment, the method further includes locating a source of the potential downlink transmission jamming signal and reconfiguring the wireless network if the potential downlink transmission jamming signal is determined to be a jamming signal.

In an embodiment, the jamming signal is a bogus PSS, a bogus SSS, a bogus BCH signal, white noise, or a combination thereof.

In an embodiment, the network measurement data include any one of the following: a Key Performance Indicator, a report on quiet time measurement when a base station in a certain region is not to transmit on a particular set of frequencies; a downlink measurement made at a base station, and a report on a bogus synchronization signal.

According to an embodiment, a system for handling a jamming signal in a wireless network comprises a processor and a non-transitory computer readable medium with computer executable instructions stored thereon. When the instructions are executed by the processor they perform a method including obtaining network measurement data on a wireless network performance, the network measurement data being data collected by a wireless network element, deriving a first performance information on the wireless network performance based on the network measurement data obtained, examining the first performance information with respect to a predefined value, and issuing an alert to indicate a presence of a potential jamming signal based on a result of the examination of the first performance information.

In an embodiment, the network measurement data are obtained from a plurality of wireless network elements including a base station and a mobile station.

In an embodiment, the system includes a Jamming Detection and Location Server and the non-transitory computer readable medium is provided in the Jamming Detection and Location Server.

In an embodiment, the first performance information relates to a Key Performance Indicator (KPI), and the predefined value is a threshold value based on historical KPI data.

In an embodiment, wherein the potential jamming signal is a potential downlink transmission jamming signal. The method performed by the instructions are executed by the processor includes obtaining additional network measurement data if the alert issued and determining whether or not the potential downlink transmission jamming signal is a jamming signal based on the additional network measurement data.

In an embodiment, the method performed by the instructions are executed by the processor includes updating the predefined value if the potential downlink transmission jamming signal is determined not to be a jamming signal.

In an embodiment, the method performed by the instructions are executed by the processor includes locating a source of the potential downlink transmission jamming signal and reconfiguring the wireless network if the potential downlink transmission jamming signal is determined to be a jamming signal.

In an embodiment, the jamming signal is a bogus PSS, a bogus SSS, a bogus BCH signal, white noise, or a combination thereof.

In an embodiment, the network measurement data include any one of the following: a Key Performance Indicator, a report on quiet time measurement during when a base station in a certain region is not to transmit on a particular set of frequencies; a downlink measurement made at a base station, and a report on a bogus synchronization signal.

According to an embodiment, a non-transitory computer readable medium has computer executable instructions stored thereon. When the instructions are executed by the processor they perform a method including obtaining network measurement data on a wireless network performance, the network measurement data being data collected by a wireless network element, deriving a first performance information on the wireless network performance based on the network measurement data obtained, examining the first performance information with respect to a predefined value, and issuing an alert to indicate a presence of a potential jamming signal based on a result of the examination of the first performance information.

BRIEF DESCRIPTION OF THE DRAWINGS

In the detailed description that follows, embodiments are described as illustrations only since various changes and modifications will become apparent to those skilled in the art from the following detailed description.

FIGS. 9C and 9D illustrate frequency reassignment and splitting according to an embodiment.

DETAILED DESCRIPTION

Figure 1:
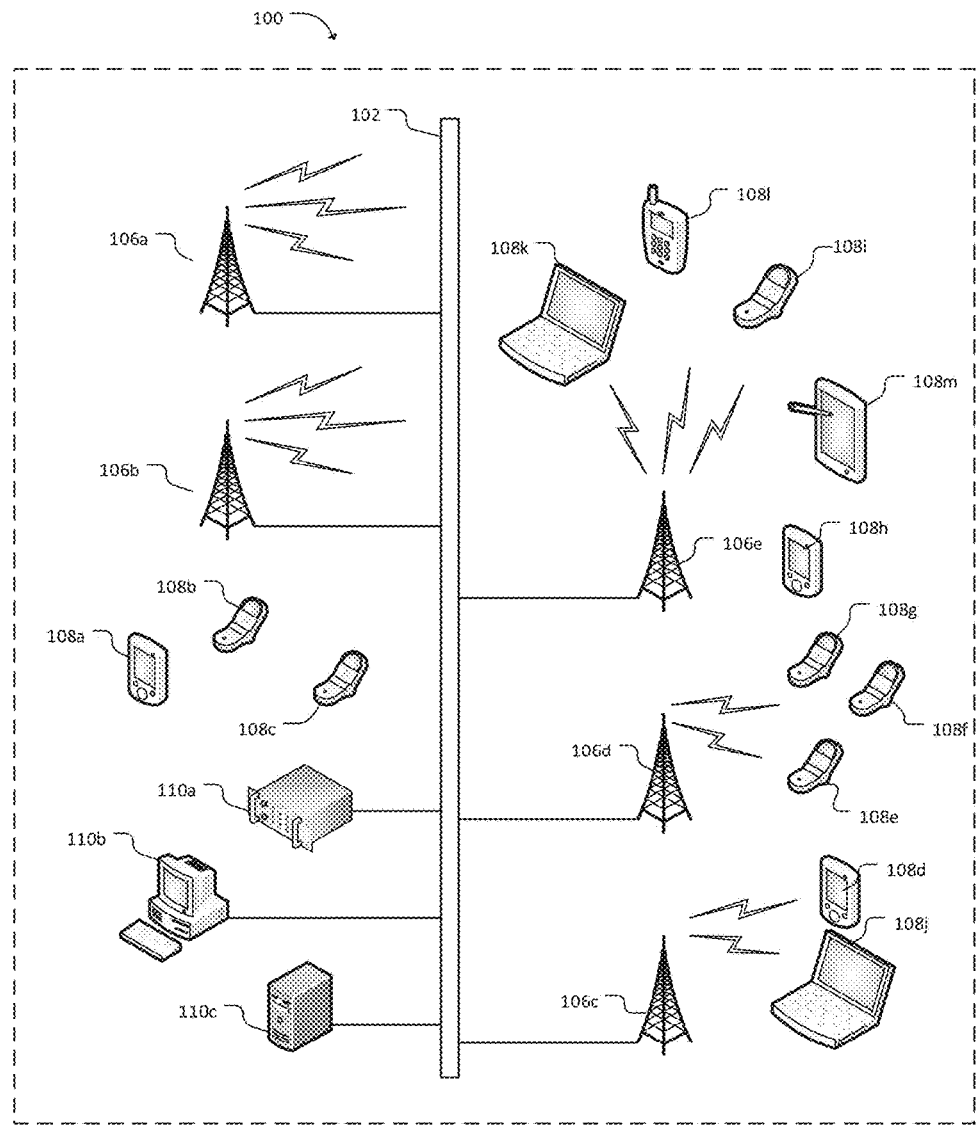
FIG. 1 illustrates a networked computing system according to an embodiment of this disclosure.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

FIG. 1 illustrates an example networked computing system 100 according to an embodiment of this disclosure. As depicted, system 100 includes a data communications network 102, one or more base stations (or eNodeBs) 106a-e, one or more network controller devices 110a-c, and one or more User Equipment (UE) 108a-m. As used herein, the term "base station" refers to a wireless communications station provided in a location that serves as a hub of a wireless network. The base stations include macrocells, microcells, picocells, and femtocells. The term "network controller device" refers to a device that manages the resources of a network. The network controller devices include Network Resource Controllers (NRCs), where the NRCs include conventional NRCs and self-organizing network (SON) controllers that can perform self-configuration, self-optimization and/or self-healing. The term "user equipment" refers to any device used directly by an end-user. The user equipment includes mobile phones, laptop computers, tablets, hand-held electronic devices with wireless communication capabilities, or the like. The terms such as "mobile station," "mobile device," "mobile terminal," "subscriber device," "subscriber," or the like, are used interchangeably with the term "user equipment."

In system 100, the data communications network 102 may include a backhaul portion that can facilitate distributed network communications between any of the network controller devices 110a-c and any of the base stations 106a-e. Any of the network controller devices 110a-c may be a dedicated NRC that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's data communications network 102 (e.g., via a point of presence).

In an embodiment, an NRC (such as a SON controller) has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in the computer readable media such as volatile or non-volatile memories of one or more communicating device(s) within the networked computing system 100.

In an embodiment, any of the network controller devices 110a-c and/or base stations 106a-e may function independently or collaboratively to implement any of the processes associated with various embodiments of the present disclosure. In a standard LTE network, any of the network controller devices 110a-c (optionally having NRC functionality) may be associated with a base station (or eNodeB), a mobility management entity (MME), or any other common network controller device known in the art, such as a Radio Resource Manager (RRM) that is described in U.S. Pat. No. 8,229,368, which is incorporated herein by reference.

In a wireless network, the number of UEs attached to a particular base station is a function of the number of active users in the base station's coverage area. If a large number of users are closer to a particular base station than its neighbors, the particular base station may have a larger number of UEs attached to it than its neighbors do, even though some of the UEs are within service range of the neighboring base stations. For example, with reference to elements of FIG. 1, base station 106a has fewer active attached UE than neighboring base stations 106b and 106e.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
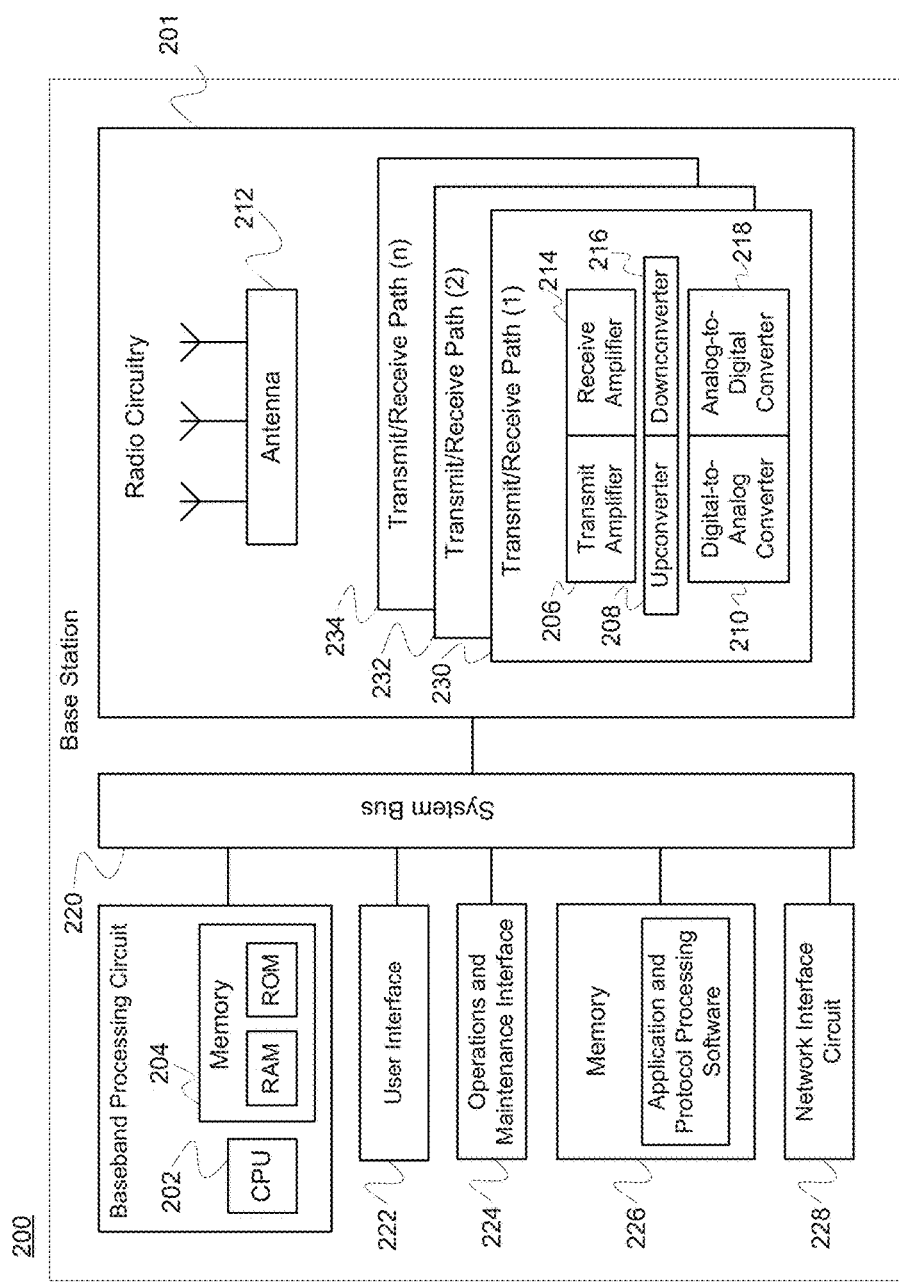
FIG. 2 illustrates an exemplary block diagram of a base station.

FIG. 2 illustrates a block diagram of a base station 200 (e.g., a femtocell, picocell, microcell or macrocell) that may be representative of the base stations 106a-e in FIG. 1. In an embodiment, the base station 200 includes a baseband processing circuit including at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

The base station 200 includes radio circuitry 201 for transmitting and receiving data to and from the network. The radio circuitry 201 may include a transmit path including a digital-to-analog converter 210 for converting digital signals from a system bus 220 into analog signals to be transmitted, an upconverter 208 for setting the frequency of the analog signal, and a transmit amplifier 206 for amplifying analog signals to be sent to the antenna 212 and transmitted as signals. In addition, the radio circuitry 201 may include a receive path including the receive amplifier 214 for amplifying signals received by the antenna 212, a downconverter 216 for reducing the frequency of the received signals, and an analog-to-digital converter 218 for outputting the received signals onto the system bus 220. The system bus 220 facilitates data communication amongst the hardware resources of the base station 200. There may be any number of transmit/receive paths 230, 232, and 234 comprising multiple digital-to-analog converters, upconverters, and transmit amplifiers as well as multiple analog-to-digital converters, downconverters, and receive amplifiers according to implementation. Additionally, antenna 212 may include multiple physical antennas for transmitting beamformed communications. In an embodiment, the base station 200 may include certain functionality associated with the network controller devices 110a-c including a Jamming Detection and Location Server whose functionality is explained in more detail below in connection with FIGS. 7-12.

The base station 200 may also include a user interface 222, an operations and maintenance interface 224, memory 226 storing application and protocol processing software, and a network interface circuit 228 facilitating communication across the LAN and/or WAN portions of a backhaul network (e.g., data communications network 102 in FIG. 1).

In an embodiment, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). In an embodiment, the base station 200 is configured to communicate with UEs 108a-m via LTE protocol.

Figure 3A:
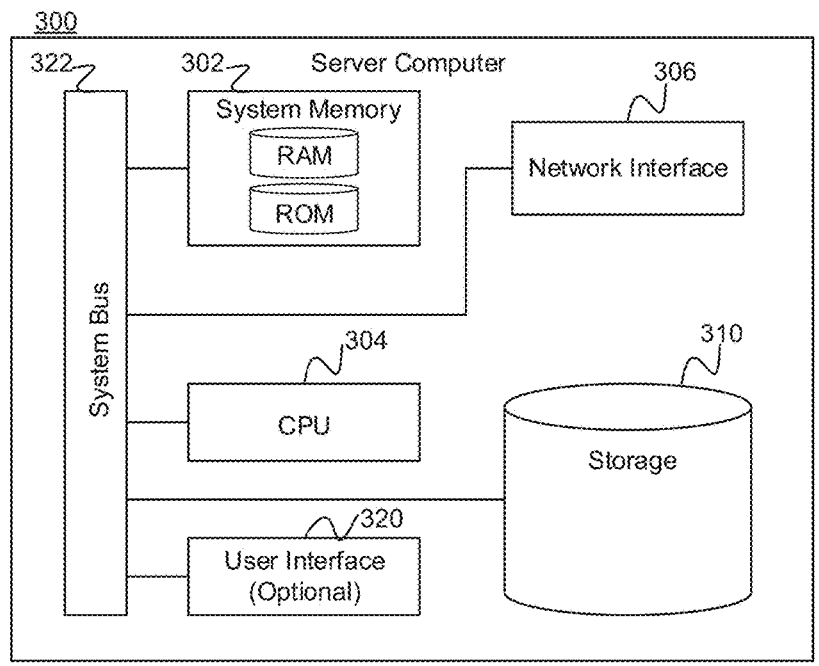
FIGS. 3A and 3B illustrate an exemplary block diagram of a server computer.
Figure 3B:
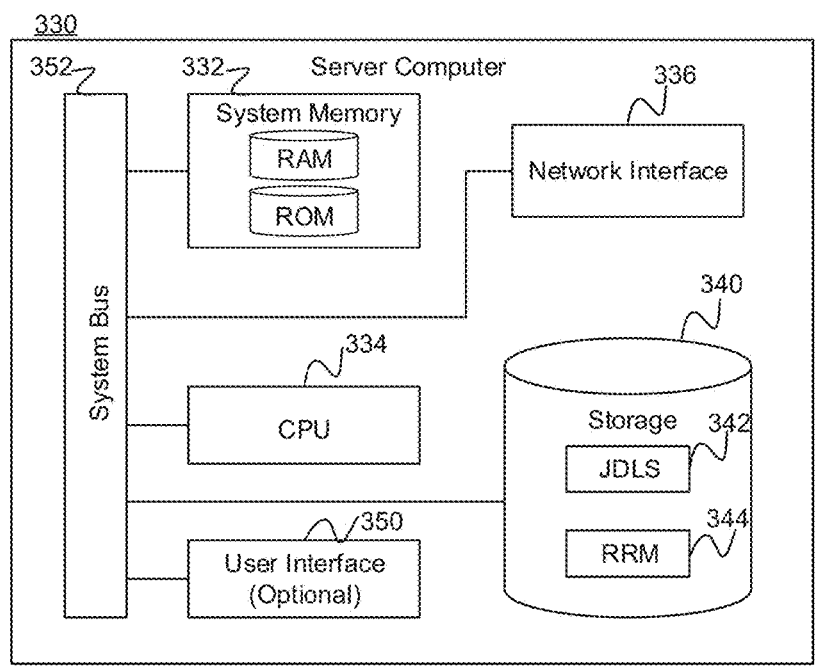

FIGS. 3A and 3B illustrate a block diagram of a server computer 300 and 330 that may be representative of any of the network controller devices 110a-c and other servers described herein. The network controller device may be implemented as a dedicated server or as part of a base station according to implementation. The server computer 300 and 330 include one or more processor devices including a central processing unit (CPU) 304 or 334. The CPU 304 or 334 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution. The CPU 304 or 334 is responsible for executing computer programs stored on volatile (RAM) and nonvolatile (ROM) memories 302 or 332 and a storage device 310 or 340 (e.g., HDD or SDD).

In an embodiment, the server computer 300 or 330 representing a network controller device 110a, 110b, 110c may be a SON controller, a RRM, or a server for detecting, locating and/or executing suitable countermeasures against jamming signals that is hereinafter referred to as a Jammer Detection and Location Server, or "JDLS". JDLS and its operations are explained below in more detailed in connection with FIGS. 7-12. As will be understood by those skilled in the art, JDLS may be implemented as software module in a server computer that performs other functions such as network resource management (or radio resource management). In an embodiment, the server computer 330 is provided with a JDLS functionality 342 and/or an RRM functionality 344 stored in the storage device 340 as illustrated in FIG. 3B.

The server computer 300 or 330 may also include an optional user interface 320 or 350 that allows a server administrator to interact with the server computer's software and hardware resources and to display the performance and operation of the networked computing system 100. In addition, the server computer 300 or 330 may include a network interface 306 or 336 for communicating with other network elements in a networked computer system, and a system bus 322 or 352 that facilitates data communications amongst the hardware resources of the server computer 300 or 330.

In addition to the network controller devices 110a-c, the server computer 300 or 330 may be used to implement other types of server devices, such as an antenna controller, an RF planning engine, a core network element, a database system, or the like. Based on the functionality provided by a server computer, the storage device of such a server computer serves as a repository for software and database thereto. For example, if the network controller device 110 is implemented, the storage device 310 or 340 may include a phase adjustment map having a listing of adjacent wireless base stations and their instantaneous transmission phase adjustments, a scheduling unit for generating a CPE phase management table for transmitting data to mobile stations associated with the server computer or base station, a beamforming unit for generating the beamformed signals for transmission to a particular mobile station, and a priority fixing unit for determining a priority level for interference associated with an adjacent interfering base station.

Figure 4:
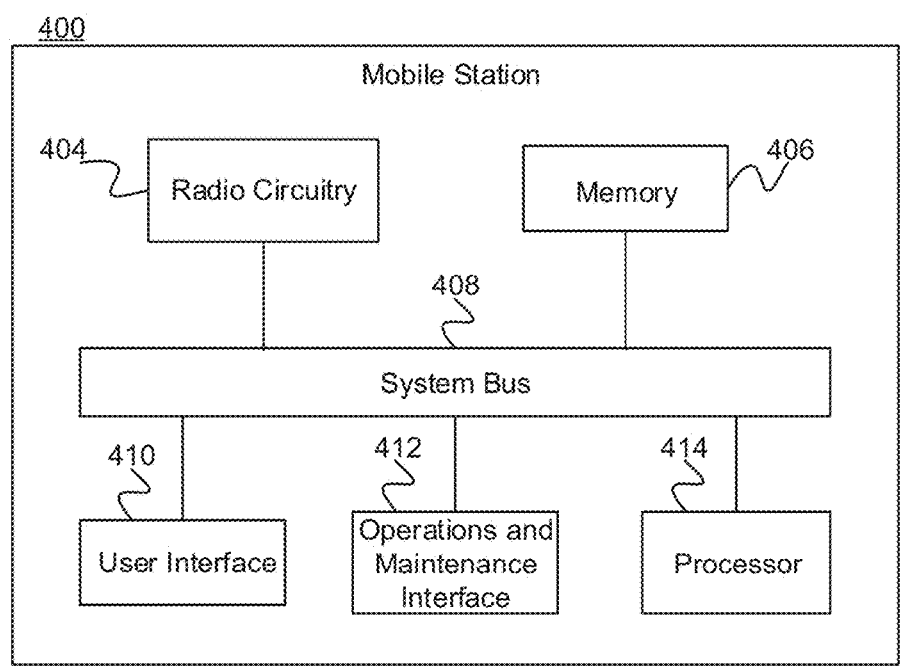
FIG. 4 illustrates an exemplary block diagram of a mobile station.

FIG. 4 illustrates a block diagram of a mobile station 400 that may be representative of any of UEs 108 shown in FIG. 1. The mobile station 400 may include components similar to those described above in connection with the base station 200. The mobile station 400 may include radio circuitry 404 corresponding to the radio circuitry 201 in FIG. 2, a memory 406 corresponding to the memory 226, a system bus 408 corresponding to system bus 220, a user interface 410 corresponding to user interface 222, an operations and maintenance interface 412 corresponding to the operations and maintenance interface 224, and a processor (or CPU) 414.

Wireless networks may be vulnerable to deliberate jamming signals designed to attack specific frequency and time resources for a portion of the frequency bandwidth, such as synchronization channels and broadcast channels in a downlink radio frame. As used herein, the term "jamming signal" refers to radio noise or signals that are transmitted deliberately in attempt to disrupt radio communications between wireless network elements such as base stations and mobile stations. Although jamming signals can exist in any frequency and time resource in an LTE radio frame, signals that jam synchronization channels in a downlink may an effective means of disruption. When a synchronization channel is attacked by jamming signals, mobile stations are prevented from accessing a cell, and idle mobile stations previously synchronized to a cell may be prevented from reselecting cells.

Figure 5:
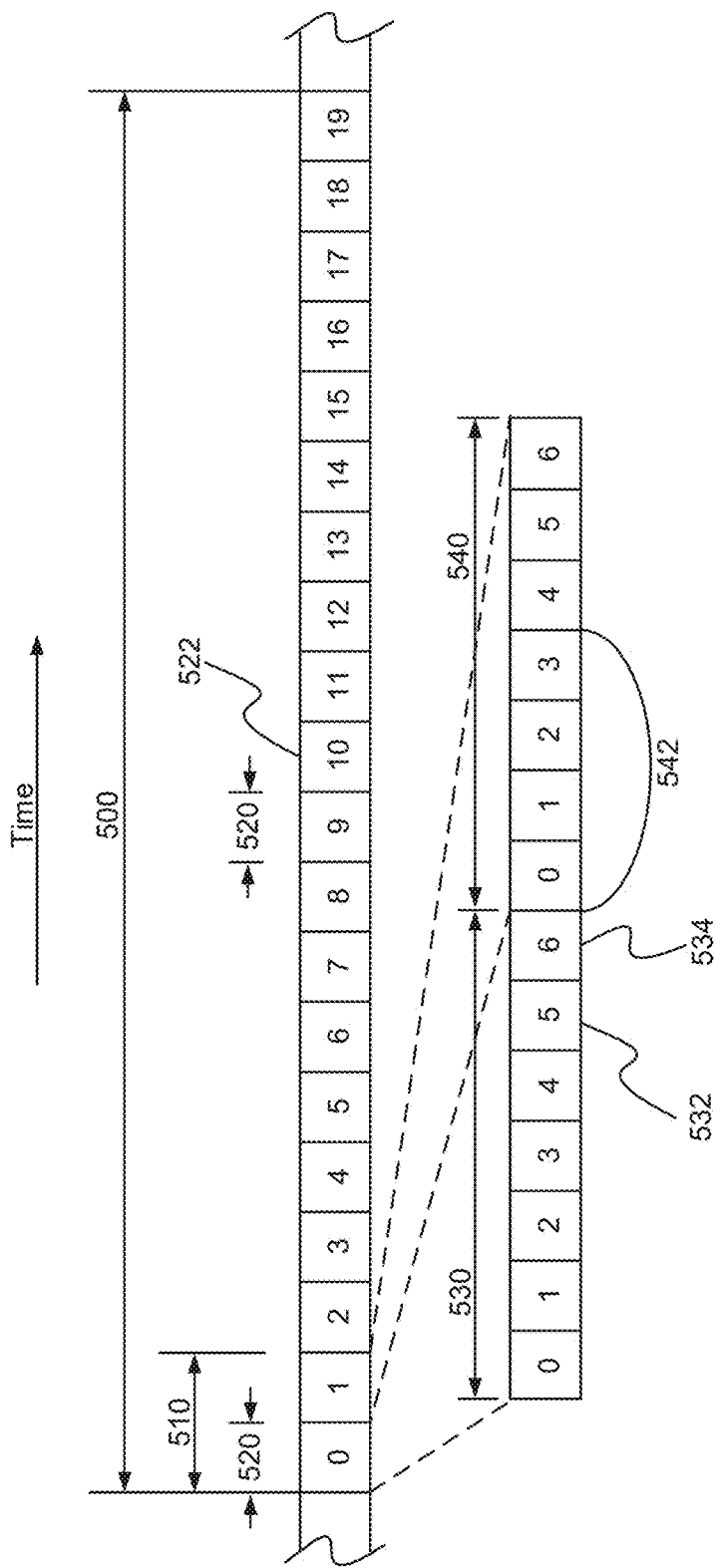
FIG. 5 illustrates the structure of a downlink radio frame broadcast by a base station in an embodiment.

FIG. 5 illustrates the structure of a downlink radio frame broadcast by a base station in an embodiment. The structure in FIG. 5 is similar to that used for LTE downlink transmissions. A frame 500 is 10 milliseconds long and may be divided into ten subframes 510 in an implementation. Each subframe 510 may be further divided into slots 520. Thus, frame 500 may have ten subframes 510 and twenty slots 520 (numbered from 0 to 19), and every pair of slots starting with slots 0 and 1 is equivalent to one subframe. As an example, slots 530 and 540 form the first subframe 510. Further, each slot includes seven Orthogonal Frequency-Division Multiplexing (OFDM) symbols (labeled 0 to 6), which are serial in the time domain. As would be understood by those skilled in the art, the vertical dimension of a symbol represents a frequency spectrum.

In an embodiment, the downlink frame 500 utilizes three different synchronization channels to synchronize a mobile station to a base station. In an initial access procedure, a mobile station detects the Primary Synchronization Signal (PSS) for initial slot synchronization and cell identity, after which it detects the Secondary Synchronization Signal (SSS) for frame synchronization, cell identity group and cyclic prefix length. After synchronizing to the base station, the mobile station can determine the location of Reference Signals and detect and decode Master Information Blocks contained in the Broadcasting Channel (BCH).

In an embodiment, the PSS can be detected in the last symbol of the first slot of a first subframe, and the SSS can be detected in the second to last symbol of the first slot of the first subframe. The PSS and SSS can be similarly repeated in the sixth subframe within a frame. The BCH may be found only once in the frame and may be detected in the first four symbols of the second slot of the first subframe.

As illustrated in FIG. 5, in an embodiment the Primary Synchronization Signal is included in a symbol 534, or a symbol 6 of slot 0 (slot 530). PSS is repeated in symbol 6 of slot 10 (slot 522). The Secondary Synchronization Signal is included in a symbol 532 or a symbol 5 of slot 0 (slot 530). SSS is repeated in a symbol 5 of slot 10 (slot 522). The Broadcasting Channel is included in symbols 542 or symbols 0 through 3 of slot 1 (slot 540). BCH is included only once in frame 500.

Figure 6:
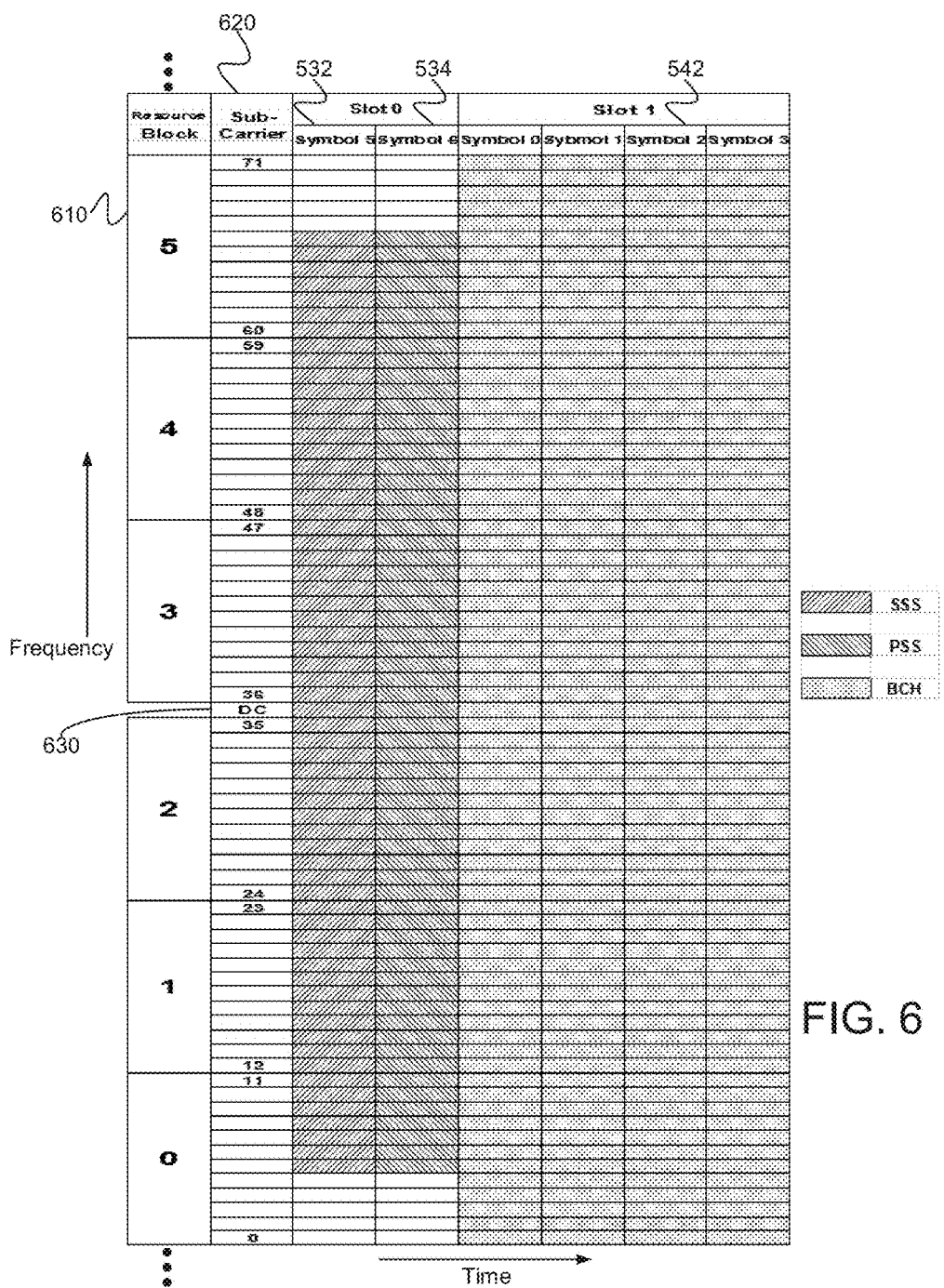
FIG. 6 illustrates a frequency and time resources allocation for synchronization signal channels and a broadcasting channel in an embodiment.

FIG. 6 illustrates a frequency and time resources allocation for synchronization signal channels, namely symbols 5 and 6 (symbols 532 and 534) of slot 0, and symbols 0 through 3 (symbol 542) of slot 1 in an embodiment. PSS, SSS and BCH are mapped to the center six frequency Resource Blocks (RBs) 610 labeled from 0 to 5. Each RB 610 includes twelve subcarriers, which are sequentially numbered in FIG. 6. PSS and SSS are mapped to the center 62 subcarriers 620, exclusive of the central DC subcarrier 630. BCH is mapped to the center 72 subcarriers 620, exclusive of the DC subcarrier 630. As a non-limiting example, the bandwidth required to carry six RBs 610 having 15 kHz subcarriers is 1.080 MHz.

Downlink transmissions, including synchronization signals, may be subject to interference that can be avoided with network reconfiguration. When measured network data indicates the presence of an interference signal, further investigation of the interference signal may be desired to distinguish an intentional jamming signal from other types of interference sources.

With respect to synchronization channels, deliberate disruption may result from a noise waveform spanning the center 63 subcarriers may be used to interfere with mobile station synchronization to PSS and SSS. The jamming noise signal may have a relatively high power spectral density, or jammer-to-signal ratio, in the frequencies utilized by the PSS and the SSS because the PSS is designed to be detected at high interference levels.

Synchronization channels may also be intentionally attacked with bogus synchronization signals that contain PSS, SSS, BCH or a combination of the signals. Bogus synchronization signals can be detected by mobile stations newly connecting to a base station, or by mobile stations performing cell reselection. For example, a bogus PSS in a different OFDM symbol from the wireless network location may prevent the mobile station from finding the frame boundary, leading to cell selection failure. In another example, once a mobile station synchronizes to a bogus PSS, the mobile station will detect SSS and BCH, but will experience cell reselection failure. Cell reselection failure will also occur with bogus SSS and BCH signals, and eventually all mobile stations may disconnect from the wireless network. Even if a mobile station was previously synchronized, the mobile station may experience Denial of Service (DOS) on cell reselection.

Figure 7:
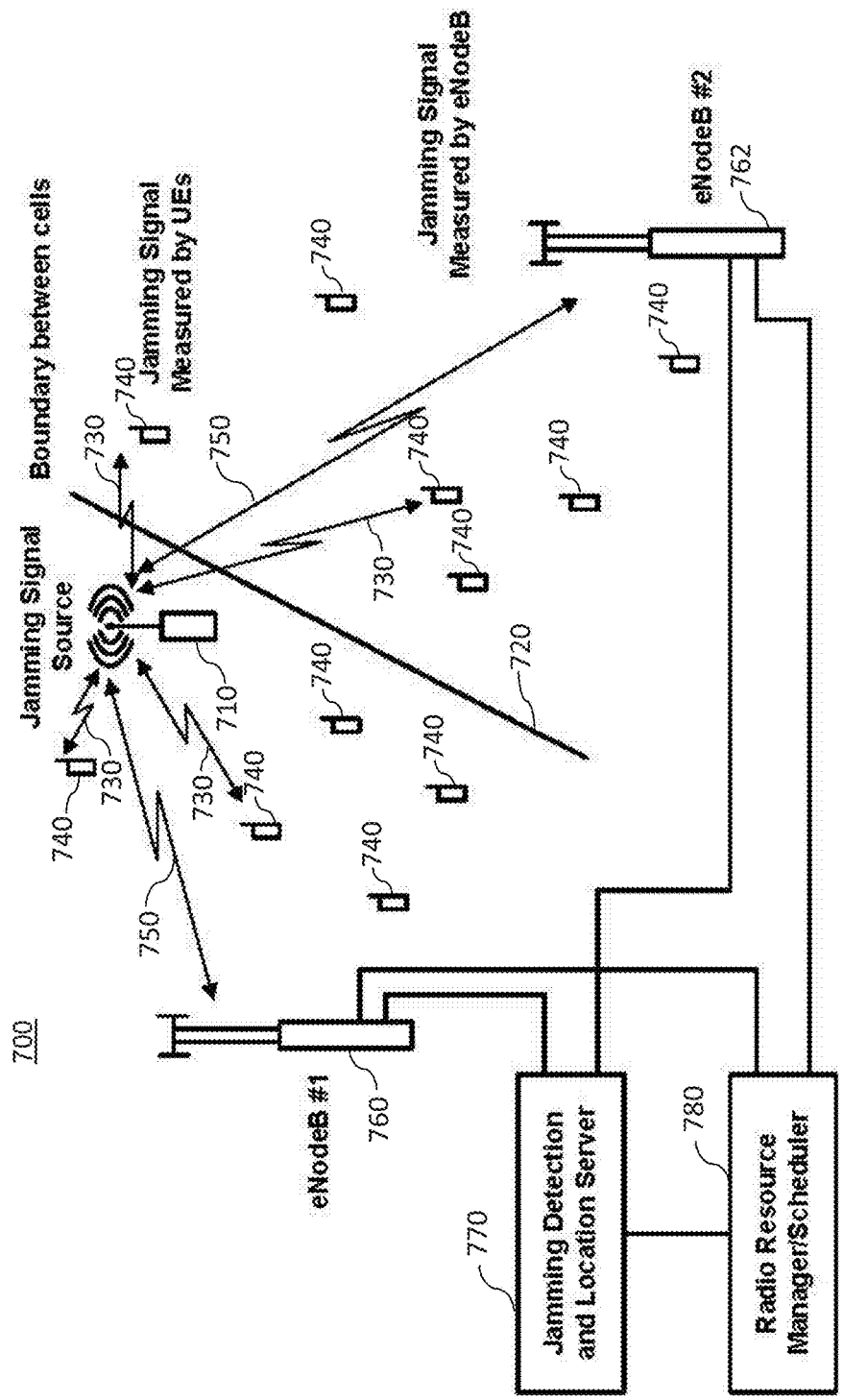
FIG. 7 illustrates a system diagram of a configuration of an LTE network in an embodiment.

FIG. 7 illustrates a system diagram of a configuration of an LTE network 700 in an embodiment. In an implementation, a jamming source 710 sends jamming signals that cross a boundary 720 between two neighboring cells, while base stations (or eNodeBs) 760 and 762 provide services to UEs 740. Jamming signals 730 are measured by UEs 740, and jamming signals 750 are measured by base stations (or eNodeBs) 760 and 762. In an embodiment, JDLS 770 monitors jamming signal measurement reports from UEs 740 or base stations (or eNodeBs) 760 and 762, or both. In an implementation, JDLS 770 generates jamming alerts when the measurement reports indicate a potential jamming signal. JDLS 770 may also localize, or determine the location of, the source of the potential jamming signal. In an embodiment, JDLS 770 is implemented as a dedicated server. JDLS 770, however, may be implemented as part of a network controller device (e.g., numeral 110 in figure for numeral 342 in FIG. 3B), or part of a base station, e.g., as software module stored in the storage device.

In an embodiment when a jamming alert is raised, an RRM 780 (or a network controller device) informs data schedulers. The data schedulers schedule the use of radio resources according to instructions received from RRM 780. RRM 780 also may instruct the data schedulers to periodically schedule network quiet times for certain radio time and frequency resources on the downlink so that the potential jamming signal can be characterized and confirmed during these periods. According to implementation, RRM 780 may be employed as a dedicated server, or part of a network controller device (e.g., numeral 110 in figure for numeral 344 in FIG. 3B), or part of a base station.

Figure 8:
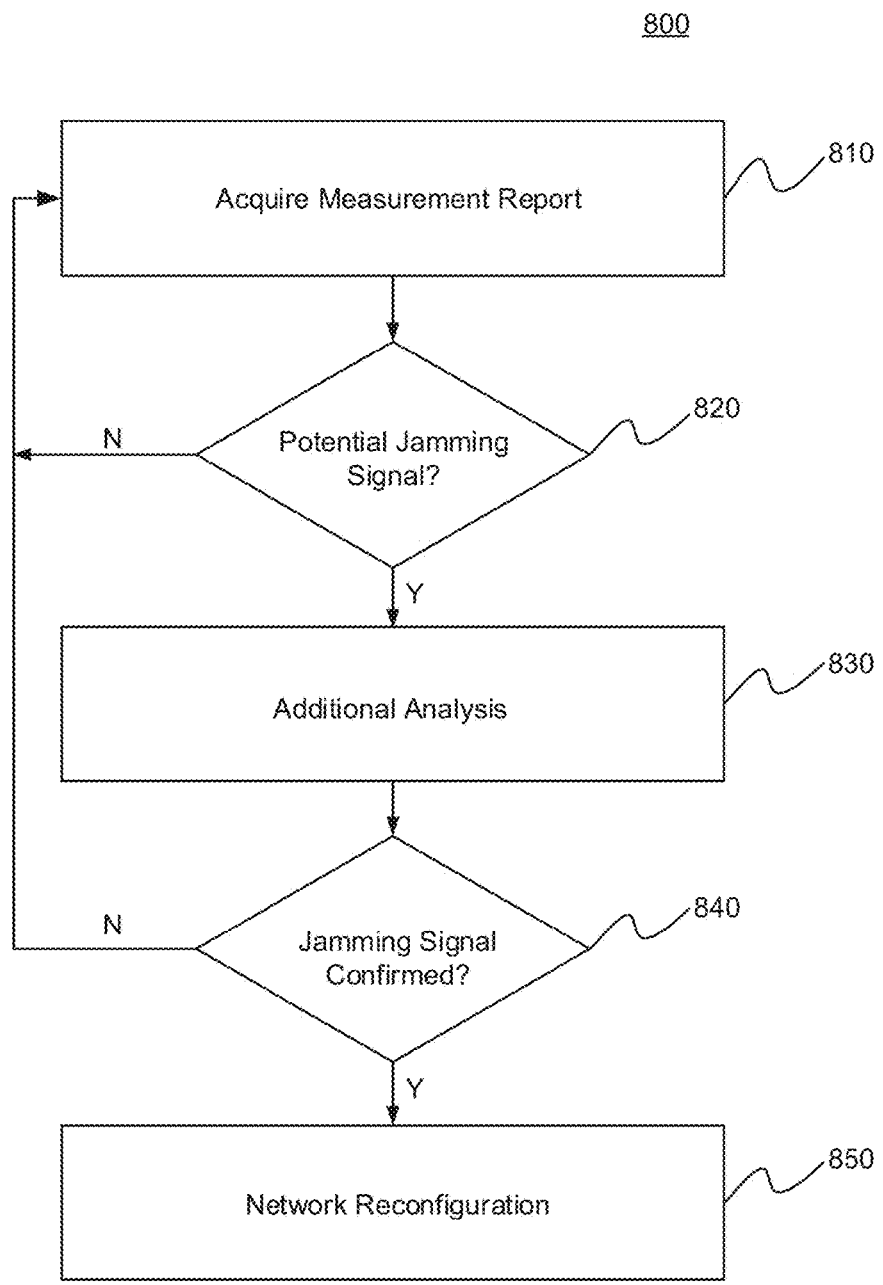
FIG. 8 illustrates a process for jamming signal detection and avoidance according to an embodiment.

FIG. 8 illustrates a process 800 for jamming signal detection and avoidance according to an embodiment. At 810, measurement reports (e.g., network measurement data) for jamming signal detection are acquired from wireless network elements such as base stations and UEs, by way of non-limiting examples. In an embodiment, the measurement reports are provided to a JDLS by the base stations. At 820, an alert is issued by the JDLS when data in the measurement reports indicates the presence of a potential jamming signal. In an embodiment, the data in the measurement reports that are used for detecting a potential jamming signal include one or more of the following: (1) key performance indicators, (2) data collected during quiet time measurements when base stations 760 and 762 do not transmit on particular frequencies, (3) downlink measurements at base stations 760 and 762, and (4) bogus synchronization signal reports.

At 830, an additional analysis is made in order to confirm the presence of a jamming signal source, e.g., by obtaining additional measurement reports by the UEs and base stations. In an embodiment, the additional analysis is performed by the JDLS, the RRM, or both in cooperation with each other. At 840, a determination is made whether or not a jamming signal is present based on the measurement reports gathered at 810 and 830. If the presence of a jamming signal is confirmed, then the wireless network is reconfigured to avoid and prevent disruption from the jamming signal. In an embodiment, the reconfiguration of the wireless network is performed by the JDLS or the RRM. Otherwise, the process 800 returns to step 810 continue monitoring the wireless network for a potential jamming signal.

Figure 9A:
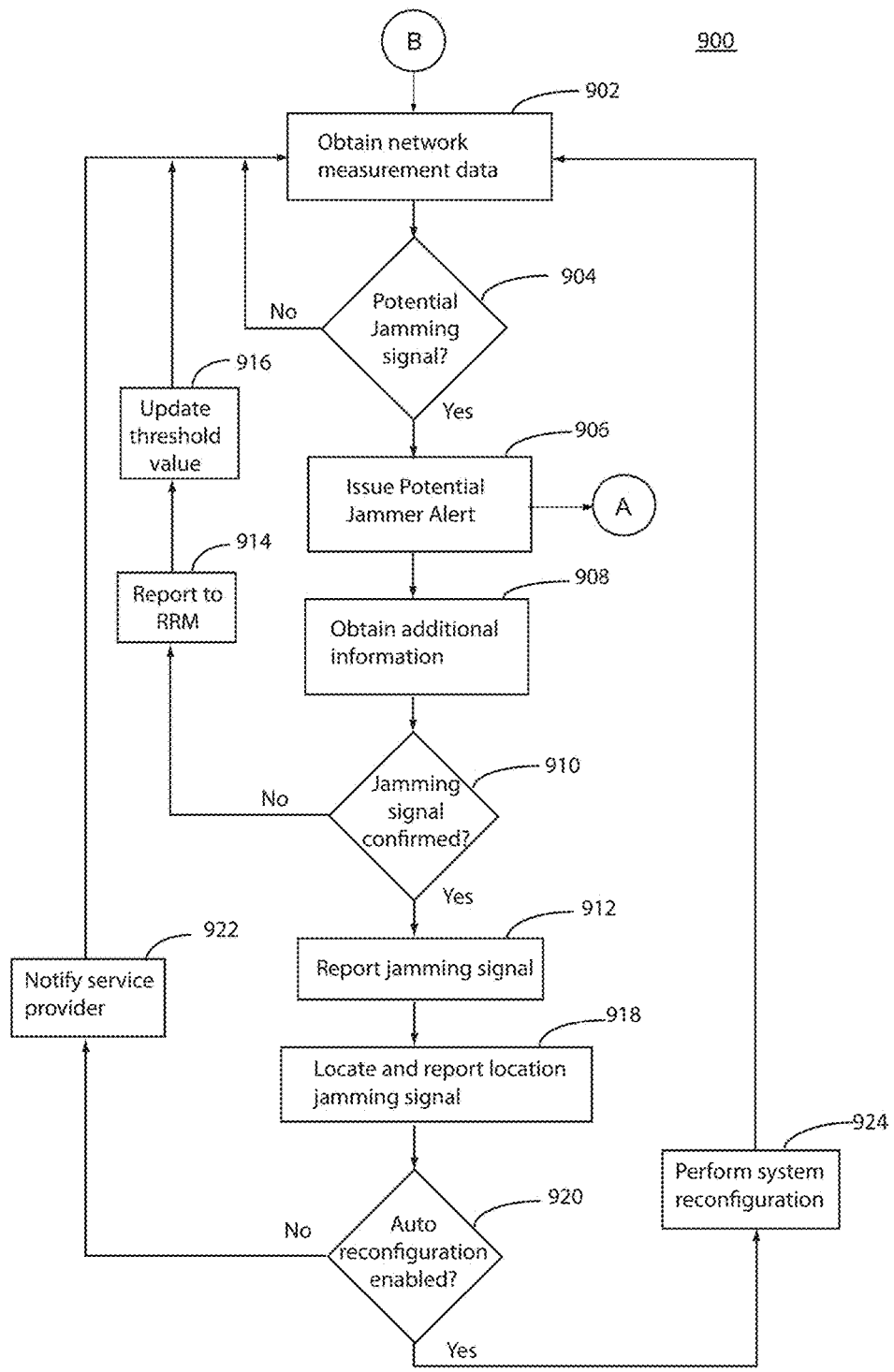
FIG. 9A illustrates a process for handling a jamming signal according to an embodiment.

FIG. 9A illustrates a process 900 for handling a jamming signal according to an embodiment. A potential jamming signal can be detected using a number of different methods. At 902, network measurement data are obtained for detecting the presence of a potential jamming signal. The network measurement data are collected continuously from wireless network elements and analyzed for an indication of a potential jamming signal. The collected network measurement data include: (1) key performance indicator (KPI) data; (2) UE reports with data collected during quiet time measurements when base stations do not transmit on particular frequencies; (3) downlink measurements at the base stations (e.g., a wireless sniffer at a base station in Frequency Division Duplexing systems and eNodeB listening mode in downlink subframes in TDD systems); and (4) UE reports on bogus synchronization signals. The collection of the network measurement data is described in more detail below in connection with FIGS. 10 through 12. As will be understood by those skilled in the art, other types of data may be collected for detecting a potential jamming signal according to an implementation.

At 904, the network measurement data are analyzed to determine whether or not there is any indication of a potential jamming signal. In an embodiment, the analysis involves comparing each type of the network measurement data with a corresponding threshold value that has been previously defined.

For example, in an implementation where Key Performance Indicator (KPI) data are used, current KPI data obtained at step 902 are compared to corresponding threshold values that have been defined based on historical KPI values. The threshold values define expected ranges for the current KPI under normal operating conditions. If any of the current KPIs is found to be outside of an expected range as defined by the corresponding threshold value, a potential jamming signal is deemed to be present in the network. The threshold values may be an incremental or decremental values. KPIs include, without limitation, the number of active user equipment (UE), cell throughput, call drop rate, and handover failure rate. In an embodiment, the KPIs may be collected for base stations in the wireless network, where each set of KPIs may be associated with a particular base station or with a geographic area. The geographic area may correspond to a coverage area of a single base station or include at least a portion of coverage areas of a plurality of base stations.

In an embodiment, a sudden decrease of the number of active UEs or cell throughput from one time period to another may be an indication of the presence of a potential jamming signal. The rates of decrease are compared with corresponding threshold values that have been predefined based on historical statistics. An indication of a potential jamming signal is detected if the rate of sudden decrease is greater in magnitude than the threshold value relating to the number of active UEs or cell throughput. Similarly, a sudden increase of the call drop rate or handover failure rates may also be analyzed with respect to the corresponding historical statistics or threshold values in order to detect an indication of a potential jamming signal.

In an embodiment, KPI data are collected by base stations and UEs and provided to a server such as a JDLS for statistical analysis. The compiled historical KPI data and historical statistics on KPIs are stored in the JDLS. These historical KPI statistics are used to define threshold values for each type of KPI. For example, the highest incremental/decremental rate for a KPI that has been determined to be non-jamming related event during a particular time period (e.g., the past year or the past three months, or the past one month) may be used as the threshold value for that KPI. The threshold values may also be adjusted according to a particular time period or a particular event occurring at a geographic region, e.g., a region near a football stadium during a football game is expected to have unusually low cell throughput. In an embodiment, the threshold values may be based on a multiple of standard deviations of KPI. The threshold values may also provide an acceptable range of values for a KPI according to implementation.

Although the network measurement data that are analyzed at step 904 has been described above in terms of KPIs, other types of network measurement data may be used as described below in connection with FIGS. 10 to 12.

Returning to 904, if the network measurement data do not meet any threshold value, the process 900 returns to 902 and continues acquiring the network measurement data from wireless network elements.

At 906, if the network measurement data meets any of the threshold values, a potential jammer alert is issued. In an embodiment, the alert is issued by a JDLS, such as by JDLS 770 in FIG. 7 as a non-limiting example. Further investigation of the causes of the potential jammer alert may be conducted to determine if the potential jamming signal is a result of intentional jamming or other types of interference sources. The alert may be reported to the service provider. Optionally, the alert may be reported to operators so that operators are aware of the existence of a potential jamming signal or other strong interference source in the network.

At 908, a JDLS or RRM instructs the base stations and UEs to obtain additional network measurement data to characterize and identify the potential jamming signal and its source. The JDLS or RRM may instruct the base stations to schedule further quiet times to allow measurements to be made to better characterize the potential jamming signals in frequency and time domains.

At 910, a determination is made whether or not the potential jamming signal is in fact a jamming signal. If the potential jamming signal is determined not to be a jamming signal, the time and frequency resource information affected by the potential jamming signal is reported at 914 to the RRM. At 916, the threshold value that triggered the potential jamming signal alert may be updated with a new value. The update may be done automatically or manually with the assistance of an administrator. Optionally, the time and frequency resources affected by the potential jamming signal may not be allocated for downlink transmissions by the RRM until the potential jamming alert is removed.

Figure 9B:
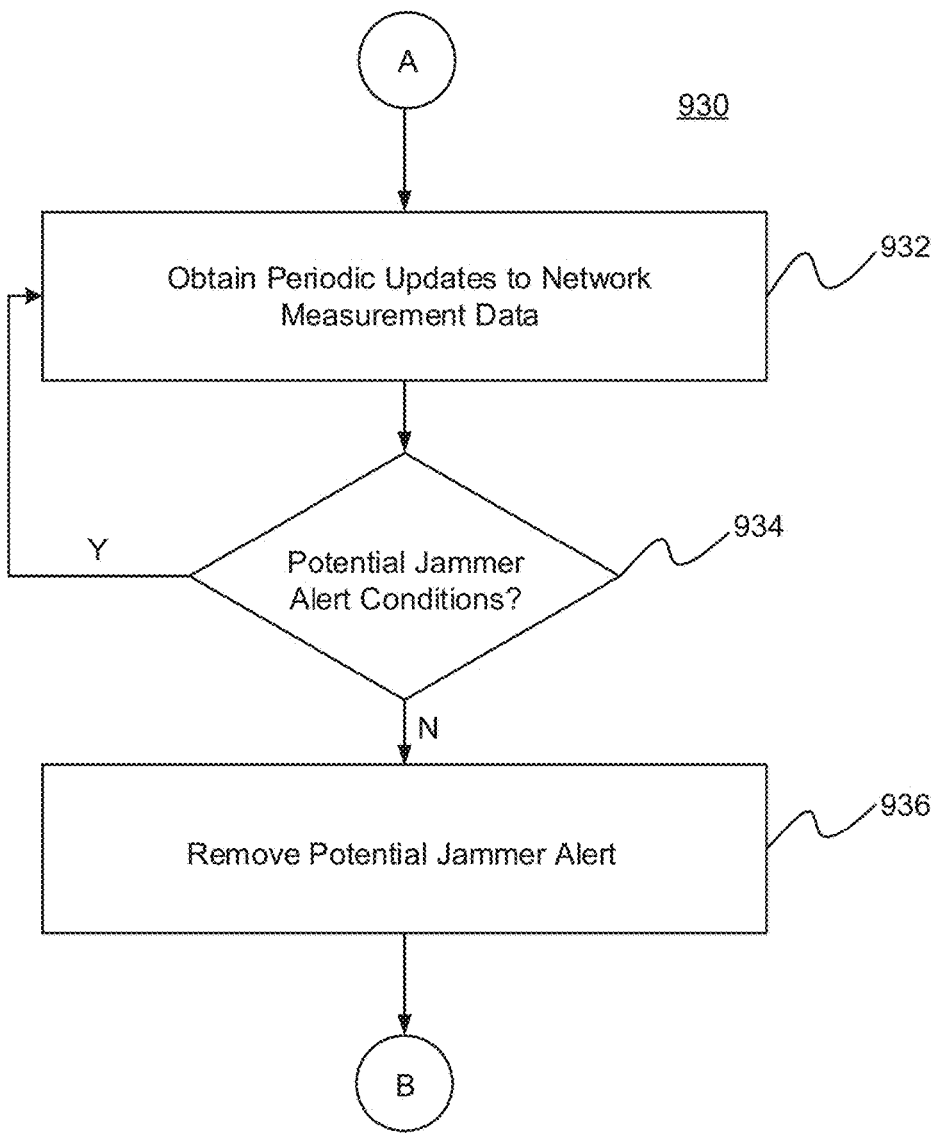
FIG. 9B illustrates a process for removing a potential jamming signal alert according to an embodiment.

FIG. 9B illustrates a process 930 for removing a potential jamming signal alert according to an embodiment. The network measurement data can be periodically monitored and the potential jammer alert can be removed when all the alert conditions return to normal. At 932, periodic updates to the network measurement data are obtained. At 934, the updated network measurement data are analyzed to determine if conditions that raised the potential jammer alert are still in place. In an embodiment, if the updated network measurement values remain outside of an expected range defined by corresponding threshold values, then the process returns to periodic monitoring of network measurement data at 932. If the updated network measurement data are within threshold values, the potential jammer alert is removed at 936. The period for monitoring network measurement data may be configurable by administrator, and the period may be optionally updated after each update. Once the potential jammer alert is removed, the system may return to obtaining network measurement data, e.g., 902 in FIG. 9.

Returning to 910, if the potential jamming signal is determined be a jamming signal, the presence of a deliberate jamming signal is reported to the service provider at 912. Optionally, at 918 the source of the jamming signal may be located and reported to the service provider. The geographical location of the potential jammer may be found using triangulation or trilateration methods based on the data collected at 902 and at 908, and the geographical information provided by UEs and base stations. Methods of locating the source of an interference signal are found in U.S. Pat. No. 8,229,368, which is incorporated herein by reference.

Optionally, at 910 and 918, signal fingerprints may be used to determine if the potential jamming signal is a known and previously characterized co-channel interference rather than intentional and unknown external interference. The amplitude and phase component of signals may be used as fingerprints. The frequency and time domain characteristics of signals can also be used as fingerprints. If the signal fingerprint reflects known interference and if the geographical location of the potential jamming signal matches the location of other network elements, then the potential jamming signal can be identified as co-channel interference.

At 920, it is determined whether or not the network can perform automatic reconfiguration and thereby prevent the jamming signal from disrupting the network. At 922, if the automatic reconfiguration is not enabled, the service provider is notified so that the network may be manually reconfigured. In some embodiments, the notification includes a recommendation on possible configuration changes that should be made, e.g., based on information gathered on the jamming signal.

At 924, if the automatic reconfiguration is enabled, RRM performs the network system reconfiguration, e.g., by frequency reassignment or splitting. If a frequency assignment is available, the synchronization signal frequency assignments may be changed to avoid the frequencies affected by the jamming signal. For example, if a signal 952 with synchronization signal frequencies 954 experiences a jamming signal 956, a new frequency bandwidth 958 having synchronization signal frequencies 960 is reassigned thereto in order to avoid disruptive effects of the jamming signal 956. Alternatively, the signal 952 may be reassigned to a new frequency bandwidth 962 having synchronization signal frequencies 964.

On the other hand, if a frequency assignment is not available, then the operating bandwidth frequency may be split into two operating system bandwidths. For example, the signal 952 may be split into two smaller frequency bandwidths 966 and 968 having synchronization signal frequencies 970 and 972, respectively, thereby avoiding frequencies used by jamming signal 956.

After reconfiguring the network, the process 900 returns to step 902 and continues monitoring the wireless network for potential jamming signals. The potential jammer alert is optionally removed or canceled.

Figure 10:
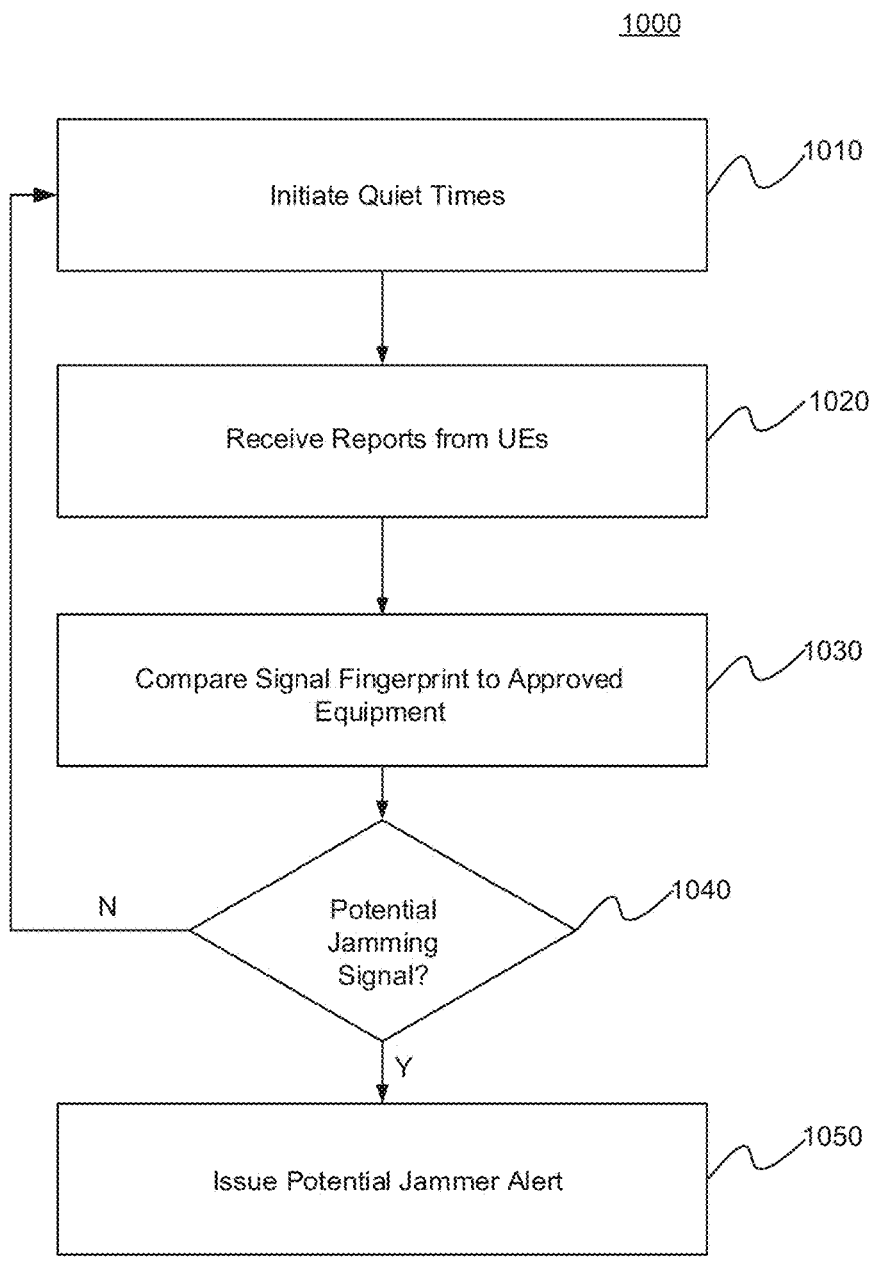
FIG. 10 illustrates a process for analyzing network measurement according to an embodiment.

FIG. 10 illustrates a process 1000 for analyzing network measurement according to an embodiment. The network measurement data analyzed involves data acquired during a period when base stations do not transmit over certain frequencies.

At 1010, a JDLS or a RRM server instructs base stations within a particular network region not to transmit on select frequencies during frequency-based quiet times. For example, a RRM server can instruct the data scheduler component to periodically schedule frequency-based quiet times on a downlink during which base stations within a particular network region are instructed not to transmit any signals including data and synchronization signals over a particular set or range of proprietary network frequencies. In another example, base stations may be instructed not to transmit PSS, SSS or BCH, or other control signals that would typically be transmitted on a periodic basis. If there is any jamming signal source in the region, it would continue to transmit jamming signals while the base stations are quiet. UEs in the vicinity of a jamming signal would detect and collect information on the jamming signal.

At 1020, the JDLS receives a report from UEs on the signal activities during the quiet times imposed by the JDLS. The report includes the signal characteristics of signals being transmitted during the quiet times. At 1030, the signal characteristics are analyzed to determine if the signal activities during the quiet times are from interference signals or jamming signals. JDLS compares the fingerprint of the signal with that of known and approved equipment in its database. If the fingerprint does not match that any of the known and approved equipment with previously characterized interference signals, then the presence of a deliberate jamming signal may be indicated and a potential jamming alert is issued (1040 and 1050). Alternatively, a potential jammer alert may also be issued if the fingerprint matches that of equipment in a blacklist.

Figure 11:
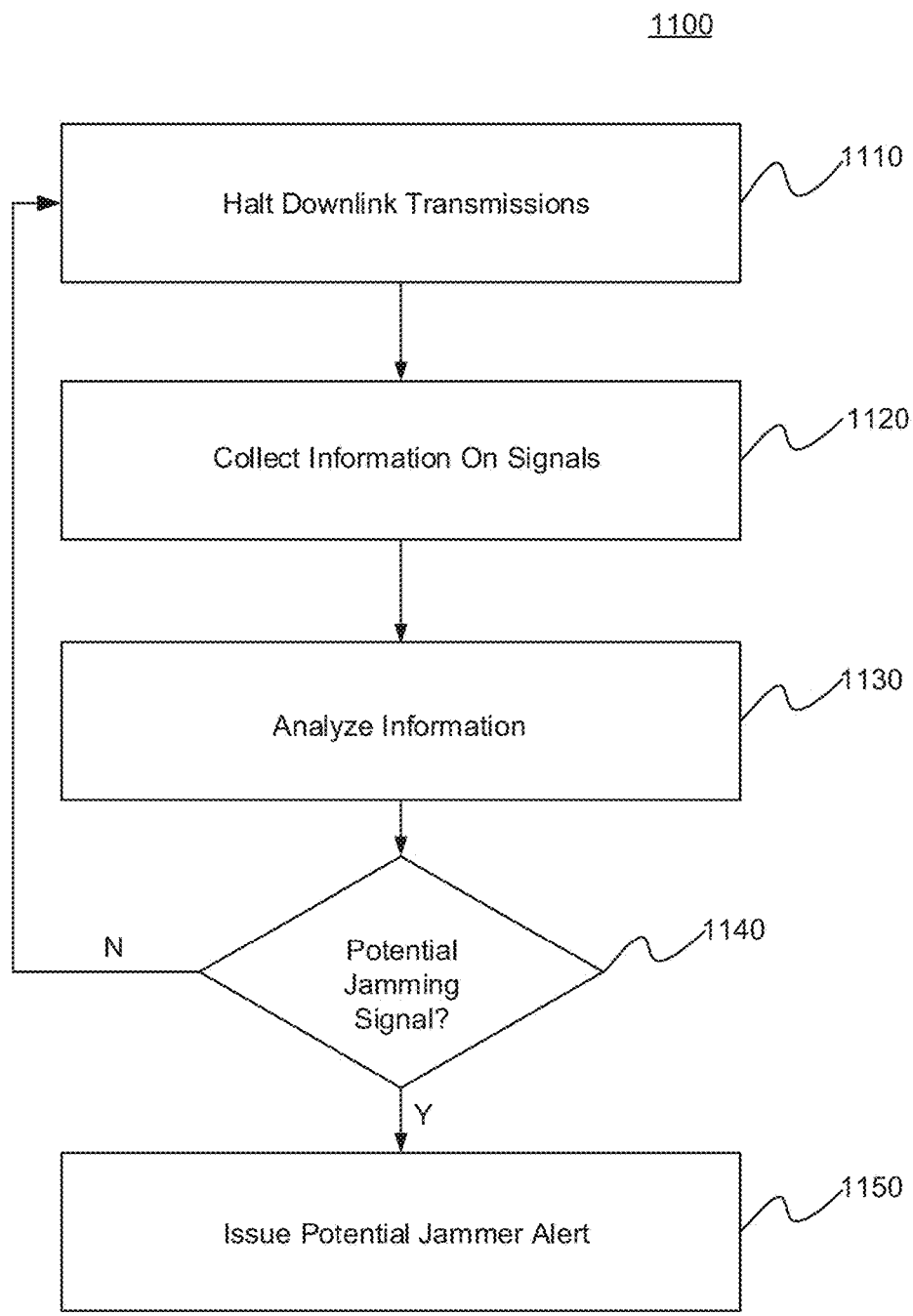
FIG. 11 illustrates a process for analyzing network measurement data according to an embodiment.

FIG. 11 illustrates a process 1100 for analyzing network measurement data according to an embodiment. The network measurement data analyzed involves downlink measurement reports collected from base stations. In some Frequency-Division Duplex (FDD) base stations, such as picocell or femtocell base stations, the base stations may receive synchronization signals and system information from a neighbor cell using a packet analyzer or Radio Environment Scanner (RES). The packet analyzer acquires the synchronization signals and system information during the initial configuration stage for optimal radio parameter settings, and may also be configured to detect neighbor cell signals periodically to maintain optional parameters used by the FDD base station.

At 1110, a JDLS instructs a base station to halt all downlink transmissions over normal operating frequencies during packet analyzer or RES listening periods. At 1120 a packet analyzer or RES is used to collect information on signals including data and synchronization signals being transmitted in a particular set of frequencies during a listening period. At 1130, the information collected is analyzed to determine whether or not there is a potential jamming signal. At 1140 and 1150, a potential jamming alert is issued and reported to the service provider when the information collected indicates that signals were being transmitted in the operating frequencies during the listening period in the coverage area associated with the base station that has been instructed to halt downlink transmissions. Otherwise, the process returns to 1110 to repeat the process.

In an embodiment, the base stations may rely on their own receivers to detect potential jamming signals instead of using an RES. For example, in some Time-Division Duplex (TDD) base stations, JDLS can instruct a base station to turn on its receivers and stop transmissions over certain operating frequencies in select downlink subframes.

Figure 12A:
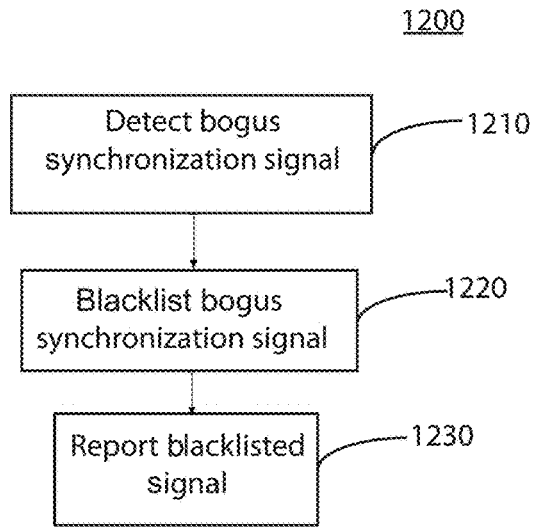
FIGS. 12A and 12B illustrate a process for handling a bogus synchronization signal report in an embodiment.
Figure 12B:
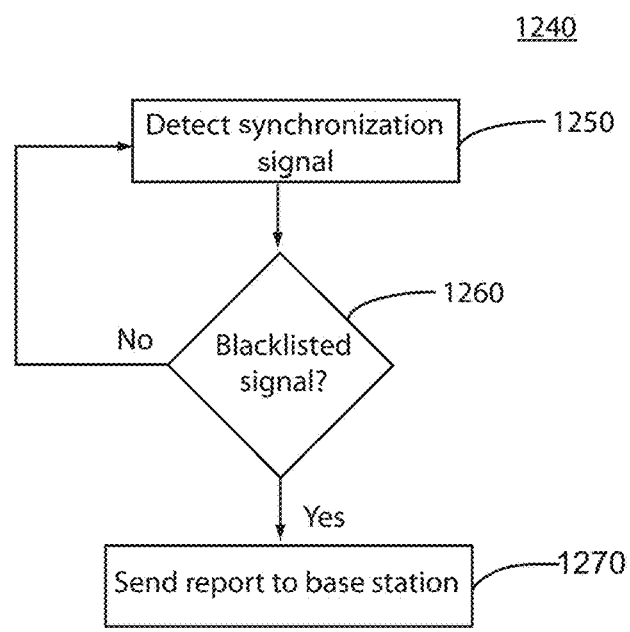

FIGS. 12A and 12B illustrate a process for handling a bogus synchronization signal report in an embodiment. In some embodiments, UEs may have the capability of cell reselection while avoiding jamming signals. UEs may keep track of the time delay in the cross-correlation for all synchronization signals. In process 1200, when a bogus synchronization signal is detected at 1210, for example due to a cell reselection failure, the UE may blacklist the synchronization signal with its fingerprint at 1220. In an embodiment, the fingerprint may include the time delay from the frame boundary. At 1230, the blacklisted signal is reported to the base station or JDLS, and a potential jamming signal alert can be raised.

In an embodiment, in process 1240 when UEs detect synchronization signals at 1250, UEs may check a blacklist of known interference fingerprints to determine if the detected signal fingerprint is blacklisted at 1260. If the detected synchronization signal is in the blacklist, the UE may stop the synchronization process and send a bogus synchronization signal report to its serving base station at 1270, and a potential jamming signal alert can be raised. To avoid frequent reports, a timer may be linked to each blacklisted bogus synchronization signal.

If a potential jammer alert is triggered by bogus synchronization signal detection at UE, the JDLS may schedule more frequent quiet times at the frequency used for synchronization signals so that jammer synchronization signal and its geographical location can be detected.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A method for handling a bogus synchronization signal in a wireless network, the method comprising:
determining a key performance indicator (KPI) for the wireless network, the KPI being based on performance data collected by an element of the wireless network;
examining the KPI for the network with respect to a predefined value;

issuing an alert indicating a presence of a potential bogus signal based on a result of the examination of the first performance information; and obtaining additional network measurement data by:
  scheduling quiet resource blocks in which no transmissions occur from a base station in channels used for base station synchronization,
  receiving signals during the quiet resource blocks,
  determining time and frequency characteristics of the received signals, and
  comparing the time and frequency characteristics of the received signals to time and frequency characteristics of known bogus signals including at least one of a bogus Primary Synchronization Signal (PSS), a bogus Secondary Synchronization Signal (SSS), and a bogus Broadcast Channel (BCH) signal stored in a database of the known bogus signals to determine whether the received signals include one of the known bogus signals, wherein the bogus signal includes at least one of a bogus Primary Synchronization Signal (PSS), a bogus Secondary Synchronization Signal (SSS), and a bogus Broadcast Channel (BCH) signal.

2. The method of claim 1, wherein the wireless network is a Long-Term Evolution (LTE) network.

3. The method of claim 2, wherein the KPI is one selected from the following: a number of active user equipment (UE) connected to a base station, a cell throughput for a region, a call drop rate for a region, and a handover failure rate for a region.

4. The method of claim 2, wherein the predefined value is a threshold value based on historical KPI data.

5. The method of claim 4, wherein the examining step involves determining whether or not the first performance information meets or exceeds the threshold value.

6. The method of claim 1, further comprising:
  updating the predefined value if the potential bogus signal is determined not to be a bogus synchronization signal.

7. The method of claim 1, further comprising:
  determining a geographic location of a source of the potential bogus signal; and
  reconfiguring the wireless network if the potential bogus signal is determined to be a bogus synchronization signal.

8. A system for handling a bogus synchronization signal in a wireless network, the system comprising:
  a processor; and
  a non-transitory computer readable medium with computer executable instructions stored thereon which, when executed by the processor, perform the following method:
  determining a key performance indicator (KPI) for the wireless network, the KPI being based on performance data collected by an element of the wireless network;
  examining the KPI for the network with respect to a predefined value; and
  issuing an alert indicating a presence of a potential bogus synchronization signal based on a result of the examination of the first performance information; and
  obtaining additional network measurement data by:
    scheduling quiet resource blocks in which no transmissions occur from a base station in channels used for base station synchronization,
    receiving signals during the quiet resource blocks,
    determining characteristics of the received signals, and
    determining time and frequency characteristics of the received signals, and
    comparing the time and frequency characteristics of the received signals to time and frequency characteristics of known bogus signals including at least one of a bogus Primary Synchronization Signal (PSS), a bogus Secondary Synchronization Signal (SSS), and a bogus Broadcast Channel (BCH) signal stored in a database of the known bogus signals to determine whether the received signals include one of the known bogus signals, wherein the bogus signal includes at least one of a bogus Primary Synchronization Signal (PSS), a bogus Secondary Synchronization Signal (SSS), and a bogus Broadcast Channel (BCH) signal.

9. The system of claim 8, wherein the network measurement data are obtained from a plurality of wireless network elements including a base station and a mobile station.

10. The system of claim 8, wherein the system includes a Jamming Detection and Location Server and the non-transitory computer readable medium is provided in the Jamming Detection and Location Server.

11. The system of claim 8, wherein the predefined value is a threshold value based on historical KPI data.

12. The system of claim 8, wherein the method further comprises:
  updating the predefined value if the potential bogus synchronization signal is determined not to be a bogus signal.

13. The system of claim 8, wherein the method further comprises:
  determining a geographic location of a source of the potential bogus synchronization signal; and
  reconfiguring the wireless network if the potential bogus synchronization signal is determined to be a bogus signal.

14. A non-transitory computer readable medium with computer executable instructions stored thereon which, when executed by the processor, perform the following method:
  determining a key performance indicator (KPI) for the wireless network, the KPI being based on performance data collected by an element of the wireless network;
  examining the KPI for the network with respect to a predefined value; and
  issuing an alert indicating a presence of a potential bogus synchronization signal based on a result of the examination of the first performance information; and
  obtaining additional network measurement data by:
    scheduling quiet resource blocks in which no transmissions occur from a base station in channels used for base station synchronization,
    receiving signals during the quiet resource blocks,
    determining time and frequency characteristics of the received signals, and
    comparing the time and frequency characteristics of the received signals to time and frequency characteristics of known bogus signals including at least one of a bogus Primary Synchronization Signal (PSS), a bogus Secondary Synchronization Signal (SSS), and a bogus Broadcast Channel (BCH) signal stored in a database of the known bogus signals to determine whether the received signals include one of the known bogus signals, wherein the bogus signal includes at least one of a bogus Primary Synchronization Signal (PSS), a bogus Secondary Synchronization Signal (SSS), and a bogus Broadcast Channel (BCH) signal.

15. The method of claim 1, wherein, when a result of the comparison is that the potential bogus synchronization signal is at least one of a bogus Primary Synchronization Signal (PSS), a bogus Secondary Synchronization Signal (SSS), and a bogus Broadcast Channel (BCH) signal:
- assigning a new frequency band to at least one of a Primary Synchronization Signal (PSS), a Secondary Synchronization Signal (SSS), and a Broadcast Channel (BCH) signal that is transmitted by one or more base station of the wireless network that is affected by the at least one of a bogus Primary Synchronization Signal (PSS), a bogus Secondary Synchronization Signal (SSS), and a bogus Broadcast Channel (BCH) signal.

16. The method of claim 1, wherein, when a result of the comparison is that the potential bogus synchronization signal is at least one of a bogus Primary Synchronization Signal (PSS), a bogus Secondary Synchronization Signal (SSS), and a bogus Broadcast Channel (BCH) signal:
- splitting a frequency assignment for at least one of a Primary Synchronization Signal (PSS), a Secondary Synchronization Signal (SSS), and a Broadcast Channel (BCH) signal that is transmitted by one or more base station of the wireless network that is affected by the at least one of a bogus Primary Synchronization Signal (PSS), a bogus Secondary Synchronization Signal (SSS), and a bogus Broadcast Channel (BCH) signal.

* * * * *